(12) United States Patent
Hutter et al.

(10) Patent No.: US 6,349,966 B1
(45) Date of Patent: Feb. 26, 2002

(54) STEERING COLUMN ASSEMBLY

(75) Inventors: Robert B Hutter, South Lyon; Joseph A Wojtak, Canton; Jeff L Lust, Monroe, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/586,423

(22) Filed: Jun. 2, 2000

(51) Int. Cl.⁷ .................................................. B62D 1/00
(52) U.S. Cl. ....................... 280/771; 280/775; 280/778; 74/498
(58) Field of Search ................................ 280/771, 775, 280/778; 74/498

(56) References Cited

U.S. PATENT DOCUMENTS

| 3,966,220 A | * | 6/1976 | Forsyth et al. ............... 280/638 |
| 4,441,735 A | * | 4/1984 | Hutchinson et al. ........ 280/771 |
| 5,020,815 A | * | 6/1991 | Harris et al. ................. 280/246 |
| 5,070,741 A | * | 12/1991 | Ervin ........................... 74/492 |
| 5,194,049 A | * | 3/1993 | Knop, Jr. ...................... 474/69 |
| 5,246,084 A | | 9/1993 | Ferraiuolo et al. .......... 180/323 |
| 5,265,492 A | | 11/1993 | Snell ............................ 74/493 |
| 5,326,130 A | | 7/1994 | Gedeon et al. .............. 280/752 |
| 5,509,325 A | | 4/1996 | Thomas ........................ 74/493 |
| 5,647,652 A | | 7/1997 | Zalewski et al. ............ 312/324 |
| 5,775,459 A | * | 7/1998 | Jorg et al. .................... 180/444 |
| 5,788,276 A | * | 8/1998 | Yamanaka et al. .......... 280/771 |
| 5,984,355 A | | 11/1999 | Meidanis et al. ............ 280/777 |

FOREIGN PATENT DOCUMENTS

JP           354100032     *   8/1999   .................. 280/771

* cited by examiner

Primary Examiner—Brian L. Johnson
Assistant Examiner—Deanna Draper
(74) Attorney, Agent, or Firm—Lisa K. Mack

(57) ABSTRACT

A right hand drive steering column assembly is provided for implementation in vehicles which have been primarily designed for left hand side steering markets. As such, the engine or other vehicle components may not allow clearance for a standard steering column assembly. Therefore, the steering column assembly of the present invention provides a first steering shaft which is rotatably movable by a vehicle operator. A second steering shaft is provided which is adapted to transfer rotational motion to further steering components, thus providing steering for the vehicle. The first and second steering shafts are connected by a coupling device which transfers rotational motion of the first steering shaft to the second steering shaft.

6 Claims, 3 Drawing Sheets

STEERING COLUMN ASSEMBLY

BACKGROUND OF THE INVENTION

1. Field of the Invention

The present invention relates generally to steering column assemblies of motor vehicles and more particularly to an improved implementation for a right hand drive steering column assembly.

2. Discussion

Automobile manufacturers must develop their automobiles for various markets around the world. Individual markets require specific vehicle characteristics in order for a vehicle to sell well in that region. Designing a specific vehicle for each market is not only a drain on resources but is effectively cost prohibitive.

As such, automobile manufacturers seek to design vehicles on a platform basis, where each vehicle in a platform can be appropriately adapted to a specific market through simple modifications. This method avoids design of a separate vehicle platform for each market. For example, a vehicle designed for American consumers may also sell well in foreign countries such as England. An English market, however, requires right hand side steering. Therefore, a standard vehicle design is engineered which may be adapted for right hand side steering.

Adapting a vehicle for a specific market potentially poses several problems. For example, vehicles may have varying engine options available. Therefore, an American automobile manufacturer may design vehicle engines to allow for left hand side steering components, biasing the right hand side of the vehicle. However, when the same vehicle with the same engine options is meant to be adapted to a foreign market, such as England, clearances for a right hand side steering column become an issue. As mentioned earlier, both resources and cost limit an automobile manufacturer's ability to design two options for the same engine just to allow for steering clearances in a foreign market.

Therefore, it is desirable in the industry to provide a steering column assembly which forgoes the above discussed limitations. Such a steering column assembly allows the implementation of right hand side steering, overcoming engine packaging limitations, in a vehicle which is inherently designed for a left hand side steering market.

SUMMARY OF THE INVENTION

In achieving these objectives, the present invention provides a steering column assembly for a motor vehicle. The steering column assembly comprises a first steering shaft centered on a first steering axis and a second steering shaft centered on a second steering axis. A coupling device is disposed on a vehicle cowl and couples the first and second steering shafts, such that rotational motion is transferred therebetween.

A preferred embodiment of the present invention provides a gear and belt system for the coupling device. Alternatively, the coupling device may incorporate a multiple gear system.

The steering column assembly of the present invention can be implemented for steering of right hand drive vehicles. The steering column assembly enables the steering components to be positioned around tightly packaged engine components such that right hand side steering may be achieved without the need for major structural modifications.

Additional advantages and features of the present invention will become apparent from the subsequent description and the appended claims, taken in conjunction with the accompanying drawings.

BRIEF DESCRIPTION OF THE DRAWINGS

FIG. 1A is a detailed perspective view of the steering column assembly of FIG. 1 according to the principles of the present invention;

DETAILED DESCRIPTION OF THE PREFERRED EMBODIMENT

While the herein described embodiment is a preferred embodiment it is meant to be exemplary in nature and is in no way intended to limit the invention or its application.

Figure 1:
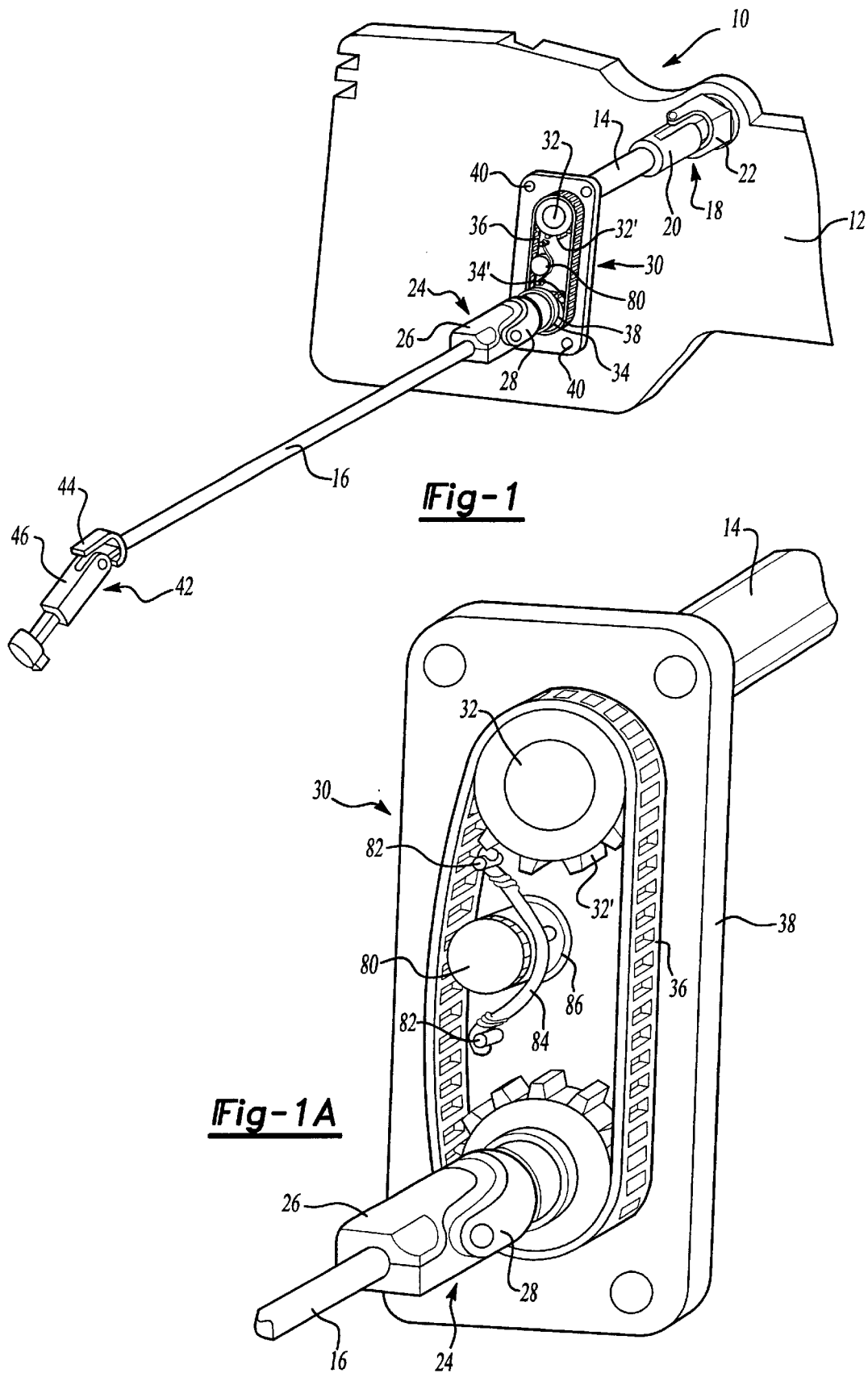
FIG. 1 is a perspective view of a steering column assembly shown operatively incorporated into a portion of a motor vehicle according to the principles of the present invention.
Figure 2:
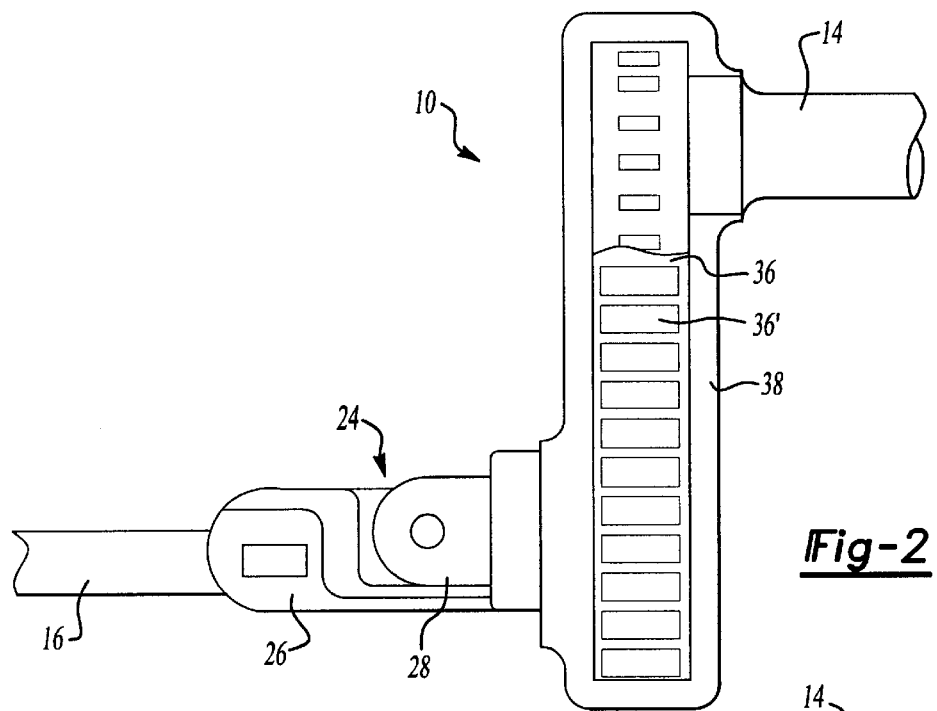
FIG. 2 is a side view of a preferred coupling device according to the principles of the present invention.

With reference to FIGS. 1 and 2, a steering column assembly 10 is detailed. Steering column assembly 10 is comprised of an upper steering shaft 14, a lower steering shaft 16 and a coupling device 30. The axis of upper steering shaft 14 runs in a first plane which is positioned higher than the axis of lower steering shaft 16 which runs in a second plane. Coupling device 30 is shown preferably disposed on a vehicle cowl 12 and links upper and lower steering shafts 14, 16.

In the preferred embodiment, coupling device 30 transfers rotational motion of upper steering shaft 14 to lower steering shaft 16. Coupling device 30 is illustrated to include an upper gear 32, a lower gear 34, a belt 36, an idler gear 80 and a plate 38. Upper gear 32 is directly attached to upper steering shaft 14, sharing a common axis. As upper steering shaft 14 rotates about its axis, upper gear 32 rotates equally. A plurality of radially extending teeth 32' are disposed around upper gear 32. Lower gear 34 is attached to lower steering shaft 16 by way of a joint 24. Joint 24 is comprised of a first knuckle 26 connected to a second knuckle 28. First knuckle 26 is directly connected to lower steering shaft 16 and second knuckle 28 is directly attached to lower gear 34. As lower gear 34 rotates about its axis, lower steering shaft 16 rotates equally. A plurality of radially extending teeth 34' are disposed around lower gear 34.

As best detailed in FIG. 1A, idler gear 80 is rotatably supported on idler plate 86. Idler plate 86 is slidably attached to plate 38 such that it is free to slide horizontally. A roller bearing (not shown) or other low friction device may be implemented to allow free sliding motion of idler plate 80 on plate 38. A spring 84 wraps around a lower portion of idler gear 80 and is attached to posts 82. As such, spring 84 biases idler gear 80 in a horizontal direction.

Plate 38 supports the individual components of coupling device 30. Both upper gear 32 and lower gear 34 are rotatably supported thereon. As mentioned above, idler gear 80 is indirectly supported by plate 38 via slidably attached idler plate 86. To implement steering column assembly 10 into a vehicle plate 38 must be attached to vehicle cowl 12. One method of attaching plate 38 to cowl 12 is via a plurality of screws 40. It should be noted, however, that the present invention is not limited to the use of screws 40 for attaching plate 38 to cowl 12 and other methods known in the art may be incorporated.

Belt 36 links upper gear 32 and lower gear 34. Belt 36 has openings 36' disposed around for receiving teeth 32', 34' of upper and lower gears 32, 34. It will be appreciated that belt 36 could be supplemented by a chain or other component which may serve to link upper gear 32 and lower gear 34. Idler gear 80 also interfaces with belt 36 such that it maintains tension in belt 36 throughout vehicle operation. To achieve this, spring 84 biases idler gear 80 into belt 36 taking up any slack which may result from normal wear. It is important to note that as belt 36 wears, and becomes less tense, idler gear 80 will increasingly be biased in a horizontal direction, towards belt 36. Additionally, idler plate 86 will be increasingly biased in the same direction. As such, the position of idler plate 86 may serve as a visual indicator as to the wear level of belt 36. Therefore, the degree of horizontal movement of idler plate 86 enables a vehicle owner or technician to determine whether or not belt 36 or coupling device 30 need be replaced.

In operation, as upper steering shaft 14 is caused to rotate, upper gear 32 rotates accordingly. Teeth 32' interface with openings 36' causing belt 36 to convey rotational motion from upper gear 32 to lower gear 34. This is achieved by openings 36' acting upon teeth 34' of lower gear 34. Thus, rotational motion is further transferred from lower gear 34 to lower steering shaft 16 through joint 24. It is appreciated that joint 24 is not limited to being directly attached to lower gear 34. As may be required by any number of possible applications, joint 24 may be located further away from lower gear 34 or not even implemented.

With further reference to FIG. 11 joint 18 is fixedly attached to upper steering shaft 14. Joint 18 is comprised of knuckle arms 20, 22 and provides mechanical communication between upper steering shaft 14 and further steering components (not shown). These components include, but are not limited to, a steering wheel and a secondary steering shaft. Joint 42 is fixedly attached to lower steering shaft 16 and comprises knuckle arms 44, 46. Joint 42 provides mechanical communication between lower steering shaft 16 and further steering components (not shown). These components include, but are not limited to, a steering rack and a secondary steering shaft.

Figure 3:
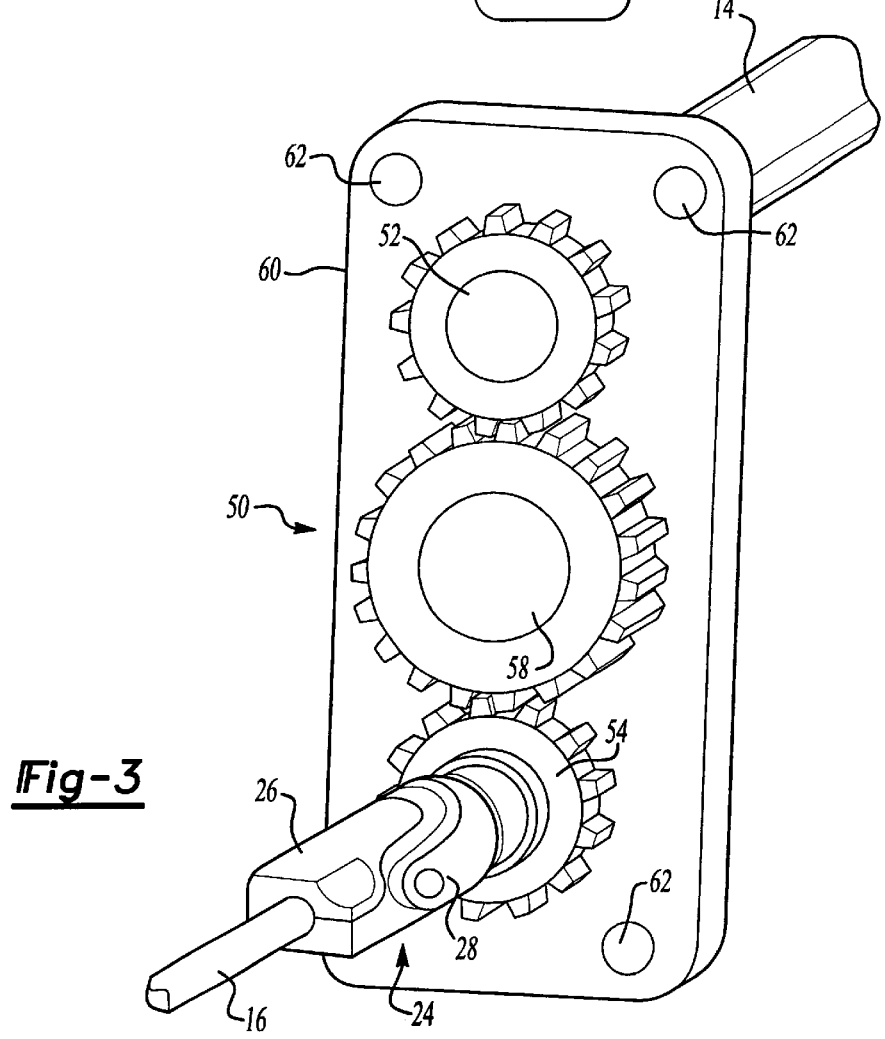
FIG. 3 is a perspective view of an alternative coupling device according to the principles of the present invention.

Referencing FIG. 3, an alternative coupling device 50 is illustrated for steering column assembly 10. Coupling device 50 comprises an upper gear 52, a lower gear 54, a central gear 56 and a plate 60. Similarly to coupling device 30, coupling device 50 transfers rotational motion from upper steering shaft 14 to lower steering shaft 16. Upper gear 52 is fixedly attached to upper steering shaft 14 and has radially extending teeth 52'. Upper steering shaft 14 and upper gear 52 have a common axis of rotation. Central gear 56 has radially extending teeth 56' and is supported by pin 58 which runs through the rotational axis of central gear 56. Lower gear 54 has radially extending teeth 54' and is in mechanical communication with lower steering shaft 16 through joint 24.

In operation, rotational motion of upper steering shaft 14 causes equivalent rotational motion of upper gear 52. Teeth 52' of upper gear 52 mesh with teeth 56' of central gear 56 causing rotational motion of central gear 56 in an opposite direction as that of upper gear 52. Subsequently, teeth 56' of central gear 56 mesh with teeth 54' of lower gear 54 causing rotational motion of lower gear in an opposite direction to that of central gear 56. As the end result, lower gear 54 rotates in the same direction as upper gear 52. Lower gear 54 then transfers the rotational motion to lower steering shaft 16. It is appreciated that upper, central and lower gears 52, 56, 54, may be sized differently, allowing for a ratio to exist between the rotation of upper steering shaft 14 and lower steering shaft 16.

Figure 4:
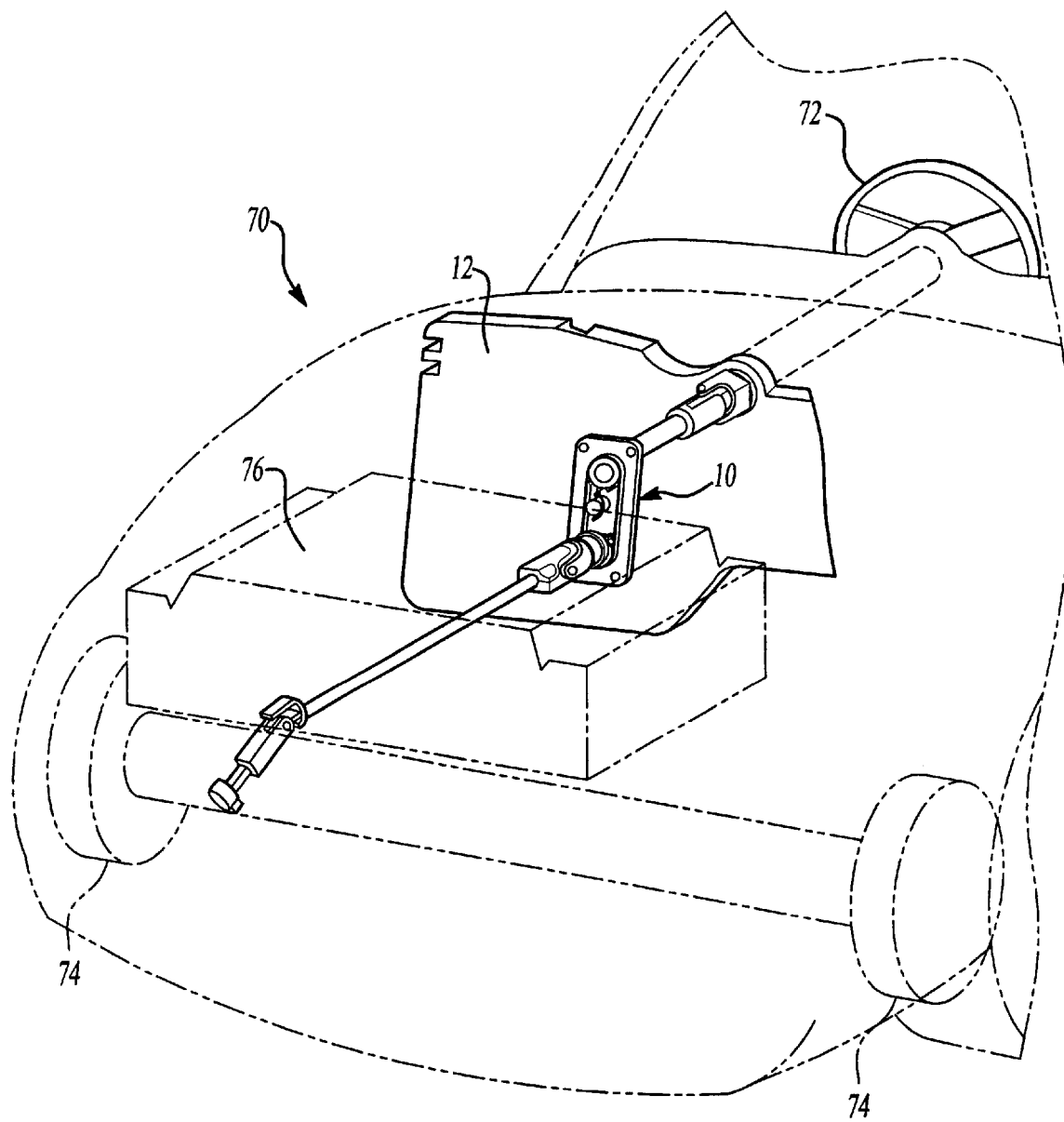
FIG. 4 is a simplified perspective view of a motor vehicle according to the principles of the present invention.

In markets such as, but not limited to, England, Japan and Australia, right hand side steering is a necessity. Referencing FIG. 4, an exemplary vehicle 70 is shown implementing steering column assembly 10 on the right hand side. Presumably, vehicle 70 is of a type designed for a left hand side steering market but is now being adapted for use in a right hand side steering environment. Steering column assembly 10 allows an operator to transfer rotational motion from a steering wheel 72 to tires 74. Additionally, an engine 76 is biased to the left side of vehicle 70, as it was presumably designed for right hand side steering clearances. As such, steering column assembly 10 ducks below engine 76 providing a clear steering path.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A steering column assembly for a motor vehicle, comprising:

a first steering shaft centered on a first steering axis;

a second steering shaft centered on a second steering axis, said second steering axis being spaced from said first steering axis; and a coupling device for coupling said first and second steering shafts such that rotational motion may be transferred therebetween, said coupling device including:

a first gear coupled for rotation with said first steering shaft, the first gear having first gear teeth;

a second gear coupled for rotation with both said second steering shaft and said first gear, the second gear having second gear teeth;

a plate for rotatably supporting said first and second gears and for direct connection to a vehicle cowl;

a belt interconnecting the first and second gears, the belt including openings for receiving the first gear teeth and the second gear teeth of the upper and lower gears; and a rotatable idler gear horizontally biased by a spring, the rotatable idler gear biasing said belt to sustain tension within said belt, the rotatable idler gear being supported by a slidably attached idler plate coupled to said plate.

2. The steering column assembly of claim 1, wherein said first steering axis is substantially parallel to said second steering axis.

3. The steering column assembly of claim 2, wherein said first steering axis is located above said second steering axis.

4. A vehicle comprising:

a steering wheel;

a pair of front wheels; and a steering column assembly interconnecting said steering wheel and said front wheels, said steering column assembly including:
- a first steering shaft centered on a first steering axis;
- a second steering shaft centered on a second steering axis, said second steering axis being spaced from said first steering axis; and
- a coupling device for coupling said first and second steering shafts such that rotational motion may be transferred therebetween, said coupling device including:
  - a first gear coupled for rotation with said first steering shaft, the first gear having first gear teeth;
  - a second gear coupled for rotation with both said second steering shaft and said first gear, the second gear having second gear teeth;
  - a plate for rotatably supporting said first and second gears and for direct connection to a vehicle cowl;
  - a belt interconnecting the first and second gears, the belt including openings for receiving the first gear teeth and the second gear teeth of the upper and lower gears; and
  - a rotatable idler gear horizontally biased by a spring, the rotatable idler gear biasing said belt to sustain tension within said belt, the rotatable idler gear being supported by a slidably attached idler plate coupled to said plate.

5. The vehicle of claim 4, wherein said first steering axis is substantially parallel to said second steering axis.

6. The vehicle of claim 5, wherein said first steering axis is located above said second steering axis.

* * * * *